US006802254B2

United States Patent
Brydges et al.

(10) Patent No.: US 6,802,254 B2
(45) Date of Patent: Oct. 12, 2004

(54) METHOD AND APPARATUS FOR CONTROLLING COLOR OF A PRINTING PRESS BASED UPON COLORIMETRIC DENSITY DIFFERENCES

(75) Inventors: David Brydges, San Francisco, CA (US); Erik Tobiason, Scotts Valley, CA (US)

(73) Assignee: Delaware Capital Formation, Inc., Wilmington, DE (US)

(*) Notice: Subject to any disclaimer, the term of this patent is extended or adjusted under 35 U.S.C. 154(b) by 0 days.

(21) Appl. No.: 10/010,344

(22) Filed: Dec. 5, 2001

(65) Prior Publication Data

US 2002/0124757 A1 Sep. 12, 2002

Related U.S. Application Data

(60) Provisional application No. 60/251,699, filed on Dec. 6, 2000.

(51) Int. Cl.[7] .............................. B41F 31/00; B41F 1/66

(52) U.S. Cl. ...................................... 101/335; 101/484

(58) Field of Search ................................ 101/335, 365, 101/211, 484; 382/162, 167, 112; 356/421, 425; 358/1.1, 1.9, 302, 521, 523

(56) References Cited

U.S. PATENT DOCUMENTS

| | | | | |
|---|---|---|---|---|
| 3,890,048 | A | * 6/1975 | Abbondio et al. | 356/425 |
| 4,439,038 | A | 3/1984 | Mactaggart | 356/408 |
| 4,660,159 | A | 4/1987 | Ott | 364/526 |
| 4,852,485 | A | 8/1989 | Brunner | 101/211 |
| 4,975,862 | A | 12/1990 | Keller et al. | 364/526 |
| 5,031,534 | A | 7/1991 | Brunner | 101/365 |
| 5,068,810 | A | 11/1991 | Ott | 364/526 |
| 5,182,721 | A | * 1/1993 | Kipphan et al. | 382/112 |
| 5,357,448 | A | 10/1994 | Stanford | 364/526 |
| 5,551,342 | A | * 9/1996 | Fuchs et al. | |
| 5,619,427 | A | * 4/1997 | Ohkubo | 358/523 |
| 5,967,050 | A | * 10/1999 | Seymour | 101/484 |
| 6,024,018 | A | 2/2000 | Darel et al. | 101/365 |
| 6,027,201 | A | * 2/2000 | Edge | 347/19 |
| 6,041,708 | A | 3/2000 | Kipphan et al. | 101/365 |
| 6,278,533 | B1 | * 8/2001 | Takemoto | 358/521 |
| 6,564,714 | B2 | * 5/2003 | Brydges et al. | 101/484 |

* cited by examiner

Primary Examiner—Anjan Deb
Assistant Examiner—Hoai-An D. Nguyen
(74) Attorney, Agent, or Firm—Stallman & Pollock LLP

(57) ABSTRACT

When a color-difference exceeds an established color tolerance, spectral reflectance values of a test area are converted to colorimetric densities and compared with target colorimetric density values for the corresponding test area from which a colorimetric density difference is established. The colorimetric density difference is utilized to determine an ink correction value.

5 Claims, 2 Drawing Sheets

METHOD AND APPARATUS FOR CONTROLLING COLOR OF A PRINTING PRESS BASED UPON COLORIMETRIC DENSITY DIFFERENCES

CROSS REFERENCE TO RELATED APPLICATIONS

This application claims the benefit of U.S. Provisional Application No. 60/251,699, filed Dec. 6, 2000, and entitled METHOD AND APPARATUS FOR CONTROLLING COLOR OF A PRINTING PRESS BASED UPON COLORIMETRIC DENSITY DIFFERENCES.

BACKGROUND OF THE INVENTION

1. Field of the Invention

The present invention relates to color control of printing presses and, in particular, to utilization of a linear equation to relate colorimetric density difference to solid ink density differences for ink regulation utilizing an empirically established correction matrix such that color-difference is minimized.

2. Discussion of the Related Art

Instrumental color control applied to the control of a printing press has as one of its main purposes the task of maintaining a visual match between an established color target location, which can be in the form of a customer supplied proof, or printed "Color OK" sheet, etc., and that same location in subsequently printed sheets such that no visually disturbing color-differences appear throughout the duration of the press run. If a color-difference exceeds the established color tolerances, then the appropriate inking adjustments are determined such that the color-difference is minimized. To determine a visual color match or color-difference instrumentally, it is a requirement that the instrument provide measurement data either directly or indirectly that are related to the spectral responses of the human eye. Such instruments include spectrophotometers and colorimeters.

In order to minimize the measured color-difference obtained from measurements using the aforementioned color measuring instrument, an equation describing the relationship between a color-difference and the appropriate control values is required. In printing, the main press control influencing the visual impression of the printed image is the inking system, which modulates the flow of ink into the press. An adjustment to the inking system in order to minimize a color difference is usually described as a density difference or an ink layer thickness difference.

For control purposes, it is highly desirable to choose a response variable that is linearly related to changes in the control variable over as large a region as possible. Although, multi-color halftone image reproduction is in general a non-linear process, under certain conditions it is possible to use linear equations to model the process by restricting the range of the transformation to a sub-region of the color gamut. Within each sub-region, which has the target color value as its origin, a set of "localized" equations can be used. The region over which the localized transformations will be linear is dependent upon the target color location and the color space used to represent the color differences used in the transformation.

Methods for performing such a procedure utilizing CIE recommended uniform color-difference parameters as the response variables are described in U.S. Pat. Nos. 4,975,862, 5,182,721 and 6,041,708.

Several aspects of the aforementioned U.S. patents can be improved upon for use in a color control system. While differences between colors described in CIE recommended uniform color space parameters, and their associated total color-difference equations, are very useful for describing color-differences, they are not the ideal color-difference descriptors from which to calculate inking control values based upon a linear model. Additionally, off-line methods of calculating the parameters of the matrix relating solid ink density differences to color-differences are not accurate enough for use in a commercial color control system. Such methods only represent the state of the system at one point in time. Dynamic methods of calculating the matrix on-line in real-time during the press run will greatly improve its effectiveness and accuracy.

SUMMARY OF THE INVENTION

The present invention provides an improved method of color control for printing presses by converting color-differences between a target area and a test area into solid ink density corrections through the use of a color space which is both colorimetric and more nearly related to solid ink density differences than the CIE recommended uniform color spaces previously used. The method maintains the use of CIE recommended uniform color parameters for determining whether or not a color correction is necessary. If a color correction is necessary, then an alternate color representation, colorimetric density, is used to determine the appropriate inking adjustments. The method establishes an increased region around a target color over which an assumption of linearity is valid. This increased linearity provides for a more accurate and robust color control method. In addition, the invention presents a robust method for calculating parameters of the linear model relating colorimetric density differences and control values on-line in real time during the press run.

The features and advantages of the present invention will be more fully understood and appreciated by reference to the following detailed description of the invention which should be considered in conjunction with the drawings.

DETAILED DESCRIPTION OF THE INVENTION

Figure 1:
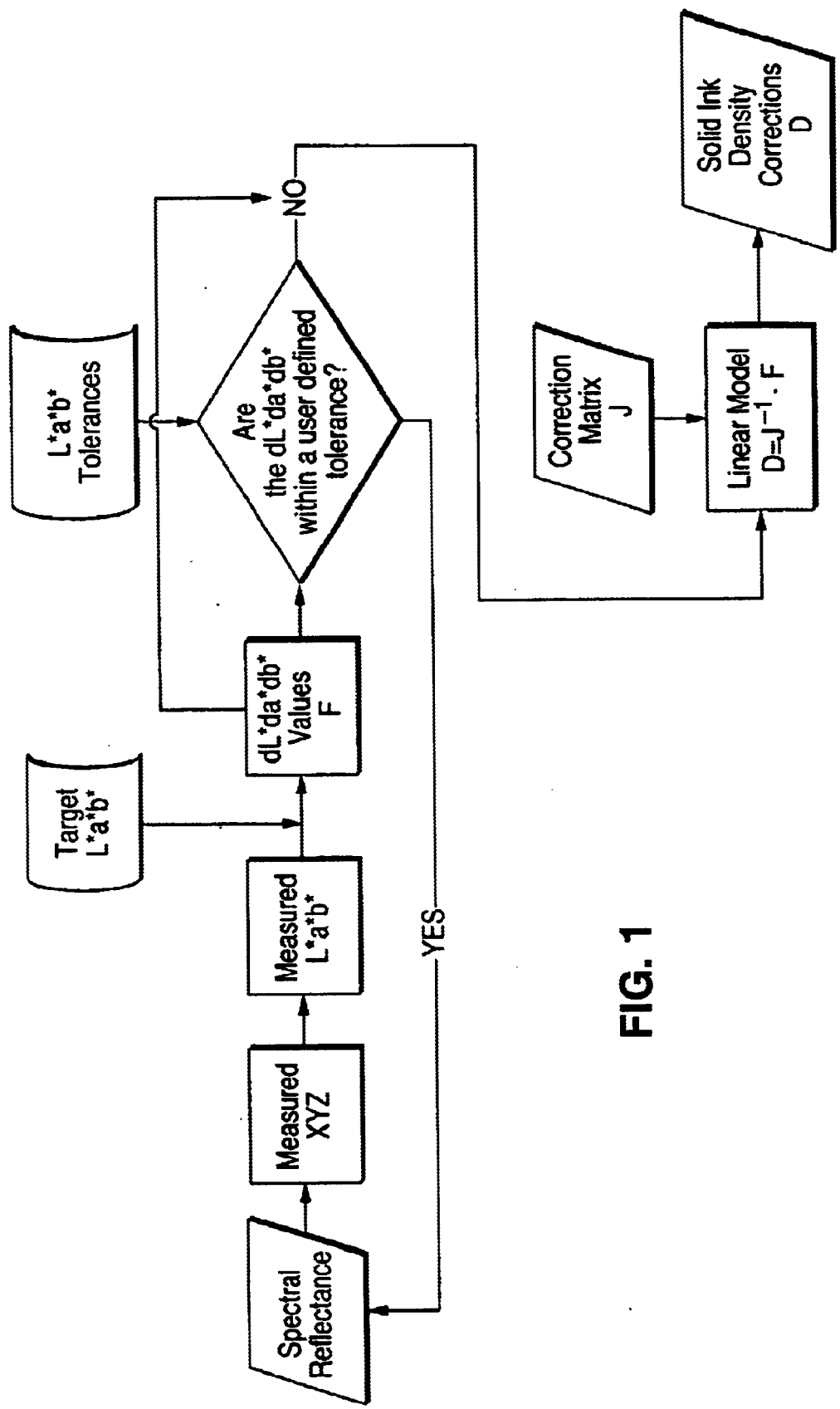
FIG. 1 is a flow chart illustrating a conventional printing press color control method.
Figure 2:
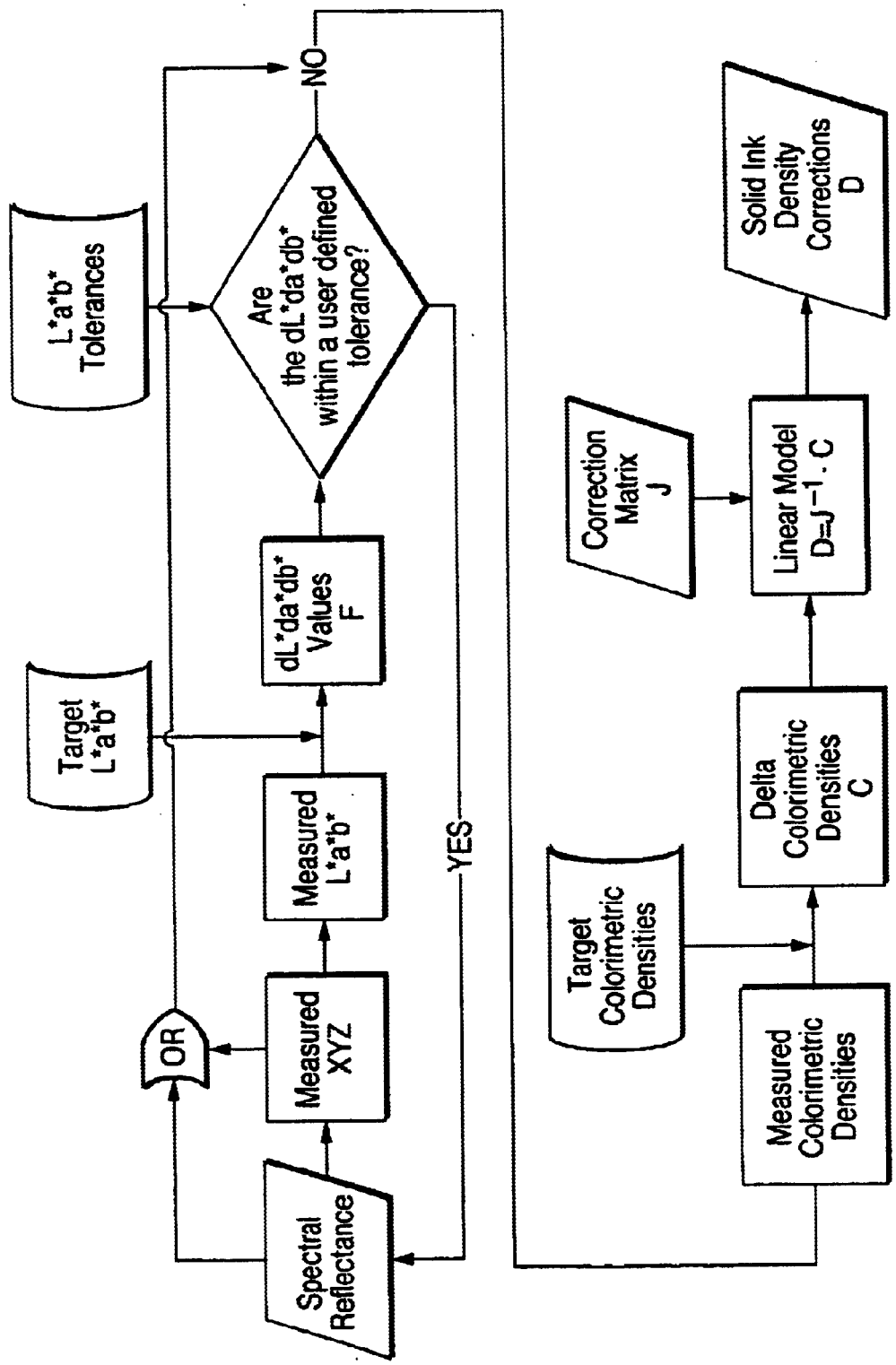
FIG. 2 is a flow chart illustrating a printing press color control technique in accordance with the present invention.

The present invention utilizes information obtained from measurements on test swatches for color control. Alternatively, the measurements could be on image areas within the printed product.

The use of test swatches for measuring print quality attributes are well known in the field and described in the literature; see e.g., "Introduction to Color Bars: A User's guide to Color Bar Application", Graphic Communications Association, 1992. Test swatches commonly found in color bars include solids (100% area coverage), halftone tints of various area coverage for each of the primary inks (black, cyan, magenta and yellow) and two and three-color overprints of the primary chromatic inks (cyan, magenta and yellow). The test swatches are typically arranged in a row across the press, perpendicular to the press direction, in the form of a color bar. The color bar can be divided into zones corresponding to the inking zones of the printing press. Control of the inking in most printing presses is carried out on a zone by zone basis where each zone corresponds to a width of, for example, 40 mm. Within each zone, an ink key, or servo in an automated ink control system, is used to adjust the amount of ink flowing into this region of the press which will in turn influence the color of the swatches located within the zone. In this manner the inking can be adjusted to produce the desired colors of the swatches.

In order to determine the color of a test swatch, a measurement instrument for detecting the light reflected from a test swatch is necessary. The measurement instrument is preferably a spectrophotometer. The preferred and well-known method for collecting and analyzing light with a spectrophotometer is the use of a spectral grating and an array of sensors with computer analysis. The output is a set of spectral reflectance values that describe the relative light reflecting characteristics of an object over the visible spectrum at some small constant width wavelength interval. The reflectance values are obtained by calculating the spectral reflectance factor, which is a ratio of the amount of light reflected from the sample relative to that of a standard reference material similarly illuminated, wavelength by wavelength across the visible spectrum. Spectrophotometers have the added advantage that the spectral reflectance values can be converted to both colorimetric and densitometric representations according to standard calculations. Throughout this document, when the term density is used outside of the context of a "colorimetric density" or "colorimetric density difference", it is used to refer to densities calculated according to standard practice as documented in, for example, American National Standard for Photography (Sensitometry)—Density Measurements—Spectral Conditions. ANSI/ISO 5/3—1984, ANSI PH2.18—1985, New York: American National Standards Institute, 1985.

According to the present invention, the spectral reflectance values of a test area are converted to color coordinates in one of the CIE recommended uniform color spaces (CIELAB, CIELUV) which have as their primary advantage the ability to quantify color in approximate visual terms. To obtain coordinates in such a color space, the spectral reflectance values of the test swatch are first converted into X, Y and Z tristimulus values according to standard well-known calculations. The weights used in the calculations include a component related to the spectral responses of the human eye for an average observer and are referred to as the CIE color-matching functions. The X, Y and Z tristimulus values are then used to calculate the color coordinates in a CIE recommended uniform color space (CIELAB or CIELUV).

The uniform color coordinates of the test swatch are compared to those of a corresponding target swatch represented in the same color space to obtain color parameter difference values. The target color coordinates may be obtained in several ways which include, measurement on a previously printed sheet termed a "Color OK" sheet, manually entered at an operator console or from pre-press data files, which are used to provide downstream operations with a priori information for increased process efficiency. Such a format currently in use is the CIP4 (International Cooperation for Integration of Processes in Pre-Press, Press and Post-Press). Furthermore, the color parameter differences such as $\Delta L^*$, $\Delta a^*$, $\Delta b^*$ and $\Delta C^*$ or $\Delta L^*$, $\Delta U^*$ and $\Delta v^*$ can be used to calculate a total color-difference using one of the well-known color-difference equations such as $\Delta E^*_{ab}$, $\Delta E^*_{uv}$, $\Delta E^*_{94}$, etc. To determine whether an inking correction is required to reduce the color-difference, the color parameter differences and total color-difference values are compared to established color tolerances for the target color. The color tolerances for a target color are established prior to printing and may be based on either industry standards or printing plant specific. If it is found that the calculated color-difference is within the established color tolerances, no correction is necessary. If the color-difference is found to exceed the established color tolerances, an inking correction is calculated such that the color-difference is minimized.

The main impetus for initially calculating a color-difference based on color space parameters from one of the CIE recommended uniform color spaces is due to their use in commonly used total color-difference equations which describe color-differences in approximate visual terms and their wide acceptance and use in standards activities and at various stages of the color image reproduction process. However, it has been found that the direct transformation between color-differences defined in CIE uniform color space parameters and solid ink density deviations used for press control is less than optimal due to the inherent differences between the two representations. As a result, an alternate representation, colorimetric density, is used for calculating the control values.

The following describes the proposed method for calculating the colorimetric densities of a test swatch for use in determining the solid ink density control values to minimize a color-difference. As previously mentioned, a color control system for the purpose of maintaining color-deviations within visually acceptable tolerances must describe colors in a manner similar to the human eye. To maintain this requirement, and bypass the aforementioned limitation in using CIE recommended uniform color difference parameters, the colorimetric density space is used. Under the Luther-Ives condition, any linear transformation of the color-matching functions will also be a set of color matching functions and will, therefore, be related to the spectral responses of the human eye. Such transformations are described in books on colorimetry, including e.g., "Measuring Color", second edition, by R. W. G. Hunt. The weights used in this work (Equations 1 and 2) are not chosen arbitrarily, but are selected to optimize the relationship between colorimetric density differences and control values.

The reverse transformation equations are used to calculate Red (R), Green (G), and Blue (B) tristimulus values from either X, Y and Z tristimulus values (Equation 1) or from spectral reflectance values (Equation 2) where n is the number of wavelength intervals. The resulting Red, Green and Blue tristimulus values, which are reflectance values, are converted into density values in the standard manner (Density=−log(Reflectance)). Since the density values are tristimulus representations, if two swatches have the same colorimetric densities and are viewed under the same viewing conditions by an observer with color vision not significantly different than the CIE E standard observer, they will look the same.

$$\begin{bmatrix} R \\ C \\ B \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} X \\ Y \\ Z \end{bmatrix} \quad \text{Equation 1}$$

$$\begin{bmatrix} R \\ G \\ B \end{bmatrix} = \begin{bmatrix} \bar{r}(\lambda)_i & \cdots & \bar{r}(\lambda)_m \\ \bar{g}(\lambda)_i & \cdots & \bar{g}(\lambda)_m \\ \bar{b}(\lambda)_i & \cdots & \bar{b}(\lambda)_m \end{bmatrix} \begin{bmatrix} P(\lambda)_i \\ \vdots \\ P(\lambda)_m \end{bmatrix} \quad \text{Equation 2}$$

As previously mentioned, a linear matrix equation is used to represent the relationship between solid ink density differences and colorimetric density differences (Equation 3).

$$C = J \cdot D \quad \text{Equation 3}$$

where C is a colorimetric density vector containing the red, green and blue filter colorimetric density differences $ACD_r$, $ACD_g$ and $ACD_b$ receptively, D is a solid ink density difference vector containing the cyan, magenta and yellow density differences $\Delta Dc$, $\Delta Dm$ and $\Delta Dy$ respectively measured through their primary color filter, and J is a 3×3 "correction" matrix relating the two vectors.

The correction matrix contains the partial derivatives of the dependent variable with respect to the independent variable. The elements of the correction matrix are highly dependent upon several factors that include the printing conditions (ink, paper, press, etc.), area coverage of the primary inks, and the location of the target color in color space. As a result, a correction matrix is required for each test area to overcome the aforementioned problems. Additionally, due to changes in the operating conditions of the press throughout a press run, which can have an influence on the print characteristics, the transformation matrix determined initially will likely need updating until the operating conditions have stabilized.

The correction matrix presented in Equation 3 relates differences in solid ink density to the corresponding differences in colorimetric density. The elements of the matrix are the partial derivatives of colorimetric density differences with respect to solid ink density differences presented below.

$$J = \begin{bmatrix} \frac{\partial CD_r}{\partial Dc} & \frac{\partial CD_r}{\partial Dm} & \frac{\partial CD_r}{\partial Dy} \\ \frac{\partial CD_g}{\partial Dc} & \frac{\partial CD_g}{\partial Dm} & \frac{\partial CD_g}{\partial Dy} \\ \frac{\partial CD_b}{\partial Dc} & \frac{\partial CD_b}{\partial Dm} & \frac{\partial CD_b}{\partial Dy} \end{bmatrix}$$

The elements in column one describe the changes in the red, green and blue colorimetric densities of a specific test element for a given cyan solid ink density difference. The remaining columns describe the same relationship for a given density differences in magenta and yellow, respectively. One method of obtaining these elements would be to adjust the cyan, magenta and yellow solid ink density values independently and measure the resulting change in the red, green and blue colorimetric density values. The limitation of this approach is that it would require specific solid ink density changes to be made while the press is printing that may be contradictory to those necessary for control at that point in time thereby reducing the efficiency of the control method. The proposed method, which would overcome this limitation, estimates the elements of the correction matrix using the method of least-squares. The least-square estimates of the elements of the correction matrix are calculated according to Equation 4.

$$J = (X'X)^{-1} X'Y \quad \text{Equation 4}$$

where X is an m×3 matrix of values of the dependent variable, Y is an M×e matrix of values of the independent variable, and m is the number of samples used in the estimation. The elements of the correction matrix can be determined from the solid ink density and colorimetric density differences available during the initial make-ready process. In this manner, no additional solid ink density changes are necessary and the estimated elements of the matrix may further account for any secondary effects which may occur when more than one ink is adjusted simultaneously.

To obtain the necessary inking corrections for a given colorimetric density difference, we are interested in the inverse relationship presented in Equation 3. This is obtained by inverting the correction matrix and multiplying the colorimetric density difference by the inverted correction matrix (Equation 5).

$$D = J^{-1} \cdot C \quad \text{Equation 5}$$

The least-squares estimates of the correction matrix elements is determined in the same manner as presented in Equation 4 with the independent variable being colorimetric density differences and the dependent variable being solid ink density differences. Implementation of the calculated solid ink density corrections will minimize the stated color-difference.

What is claimed is:

1. A method of controlling color on a printed sheet at a printing press, the method comprising:

measuring the spectral reflectance values of a test area on the printed sheet;

converting the measured spectral reflectance values to test color coordinates in a first uniform color space;

comparing the test color coordinates in the first uniform color space to target color coordinates in the first uniform color space to obtain color parameter difference values in the first uniform color space;

comparing the color parameter difference values to established color tolerance values to determine whether the color parameter difference values exceed a color tolerance threshold value;

if the color parameter difference values exceed the color tolerance threshold value, then calculating a control signal value for the printing press using control signal difference values resulting from a control difference value that is based upon a comparison of test color coordinate values measured in the test area on the printed sheet in a second uniform color space that is different than the first uniform color space and target color coordinate values in the second uniform color space.

2. A method as in claim 1, and wherein the control signal value for the printing press is calculated by converting the control difference value to solid ink density differences using a linear matrix equation.

3. A method as in claim 1, and wherein the first uniform color space is CIELAB.

4. A method as in claim 1, and wherein the first uniform color space is CIELUV.

5. A method as in claim 1, wherein the second uniform color space is based upon colorimetric density values.

* * * * *